United States Patent [19]

Itoh et al.

[11] Patent Number: 4,774,070

[45] Date of Patent: Sep. 27, 1988

[54] PRODUCTION PROCESS OF CHLORINE

[75] Inventors: Hiroyuki Itoh; Yoshitsugu Kono; Masanobu Ajioka; Shinji Takenaka; Masafumi Kataita, all of Ohmuta, Japan

[73] Assignee: Mitsui Toatsu Chemicals, Incorporated, Tokyo, Japan

[21] Appl. No.: 13,426

[22] Filed: Feb. 11, 1987

[30] Foreign Application Priority Data

Feb. 19, 1986 [JP] Japan .................... 61-032925
Feb. 21, 1986 [JP] Japan .................... 61-035350
Apr. 8, 1986 [JP] Japan .................... 61-079275
May 16, 1986 [JP] Japan .................... 61-110839

[51] Int. Cl.$^4$ ............................. C01B 7/04
[52] U.S. Cl. ................... 423/502; 423/507; 423/240
[58] Field of Search ............. 423/240 S, 502, 507

[56] References Cited

U.S. PATENT DOCUMENTS

| | | | |
|---|---|---|---|
| 2,299,427 | 10/1942 | Rosenstein | 423/502 |
| 2,678,259 | 5/1954 | Banner et al. | 423/502 |
| 3,006,732 | 10/1961 | Baumgartner et al. | 423/502 |
| 3,542,520 | 11/1970 | Borkowski | 423/502 |
| 3,989,807 | 11/1976 | Johnston | 423/502 |
| 4,394,367 | 7/1983 | Foster | 423/507 |

*Primary Examiner*—Robert L. Stoll
*Assistant Examiner*—Adriana L. Mui
*Attorney, Agent, or Firm*—Oblon, Fisher, Spivak, McClelland & Maier

[57] ABSTRACT

Chlorine is produced by oxidizing byproduced hydrogen chloride. An offgas containing hydrogen chloride as a byproduct is reacted with oxygen at 300°–500° C. in the presence of a catalyst which contains chromic oxide ($Cr_2O_3$) as a principal component. The resulting gas is cooled rapidly and then washed with water to recover vaporized chromium. The hydrogen chloride is then absorbed in water to recover it as an aqueous hydrochloric acid solution. The still remaining portion of the resultant gas is washed with sulfuric acid to remove water from the same, followed by compression and cooling. The resulting liquefied chlorine is separated. The still remaining gas composed principally of oxygen is thereafter returned to the oxidation step.

11 Claims, 1 Drawing Sheet

FIG.1

PRODUCTION PROCESS OF CHLORINE

BACKGROUND OF THE INVENTION

1. Field of the Invention

This invention relates to a production process of chlorine, and more specifically to a process for producing chlorine by oxidizing an offgas, which has been discharged from a reaction step of an organic compound and containing hydrogen chloride, with an oxygen gas.

2. Description of the Prior Art

Hydrogen chloride is byproduced in large amounts in both chlorination and phosgenation of organic compounds. It is however thrown away without utilization because the production of byproduced hydrogen chloride is far greater than the market demand for hydrogen chloride. Large expenses are also required to treat byproduced hydrogen chloride for its disposal.

The reaction in which hydrogen chloride is oxidized to produce chlorine has been known as "Deacon reaction" for many years. The copper-base catalyst which was invented for the first time by Deacon in 1868 has conventionally been considered to exhibit the best activities. Since then, a number of so-called Deacon catalysts with various compounds added as a third component to copper chloride and potassium chloride have also been proposed. Catalytic reactions making use of these catalysts however required high temperatures of 400° C. and higher. In addition, the above Deacon catalysts were insufficient in service life.

Regarding the process for producing chlorine by using a Deacon catalyst, a proposal has been made in U.S. Pat. No. 4,394,367. According to the process of this U.S. patent, a gas obtained as a result of the catalytic reaction is introduced in a sulfuric acid absorption column the temperature of which is slightly lower than the reaction temperature, so that the gas is dewatered and dried. Subsequent to its compression, impurities such as polychlorinated byproducts are extracted and removed with carbon tetrachloride and chlorine is then liquefied for its separation.

The above-proposed process however requires the recirculation and utilization of a great deal of sulfuric acid for the elimination of resultant water contained in a large amount in the thus-formed gas, because the sulfuric acid absorption column is operated at a high temperature near about 200° C. The above process cannot therefore be considered as an advantageous process in every aspect, when the initial cost and power cost are both taken into consideration.

As an improvement to the Deacon process, it is also disclosed in "The Chemical Engineering", 229 (1963) that after conducting the reaction by using air as an oxidizing agent, the resultant gas is washed with water to recover hydrogen chloride as 30% hydrochloric acid, the remaining portion of the resultant gas is dewatered and dried with sulfuric acid, and carbon tetrachloride is used as an extracting reagent for chlorine.

According to the above-proposed process, air is used as an oxygen source. The concentration of chlorine in the resultant gas is therefore low, leading to the need for a considerable power cost for the liquefaction and separation of chlorine.

As a drawback common to both of these processes, the use of a solvent such as carbon tetrachloride in the separation step after the reaction is mentioned. As a result, a cumbersome step is additionally required for the separation of chlorine and carbon tetrachloride from each other. When the remaining gas is recycled after separation of chlorine as in the process of this invention, the solvent is mixed in the recycled gas so that the chromium oxide catalyst is adversely affected.

Various proposals have also been made as to the use of chromium oxide, which is other than the aforementioned Deacon catalysts, as a catalyst. None of such proposals however indicate sufficient activities. For example, U.K. Patent No. 676,667 discloses to support $CrO_3$ on an alumina carrier, followed by calcining or reduction with hydrogen so that a trivalent chromia catalyst is formed. It however contains low conversions only. Although these chromium oxide catalysts can achieve high initial conversions, their catalytic activities are reduced significantly along the passage of time. As an improvement to this problem, it is proposed in U.K. Patent No. 846,832 to incorporate chromyl chloride in the raw material, i.e., hydrogen chloride in order to maintain the high conversions.

SUMMARY OF THE INVENTION

The present inventors have carried out an extensive investigation with a view toward developing a process for the production of chlorine in which process a chromic oxide ($Cr_2O_3$) catalyst is used and the separation and recovery step of chlorine is effected without any solvent. As a result, the chromic oxide catalyst has been found to be superior to Deacon catalysts under certain reaction conditions although chromium vaporizes slightly in the course of the reaction. In order to proceed with the reaction while maintaining the activity of the catalyst at a high level, it is necessary to maintain the catalyst always in an oxygen-dependent oxidizing atmosphere. For this purpose, oxygen is used in an amount greater than its stoichiometric equivalent to hydrogen chloride, namely, in a relatively large excess of 0.25 or greater in terms of $O_2/HCl$ molar ratio. It has also been found that the catalytic activity can be maintained at a higher level as the rate of excess oxygen increases. If air is used as an oxygen source, the concentration of chlorine in the gas obtained after the reaction becomes low, a higher cost is required for the separation and purification of chlorine. Moreover, a substantial cost is also required for the treatment and/or processing of the enormous amount of waste gas upon its release into the atmosphere. Accordingly, it is industrially disadvantageous to use air. In contrast, use of oxygen has been found to be effective in maintaining the catalytic activity. It has also been found that chlorine can be separated only by slight compression and cooling, since the concentration of chlorine in the resultant gas is high. Furthermore, it has been found that waste gas is formed in a smaller volume and the cost required upon its release in the atmosphere is hence lowered. It has however been found that the above process requires to use oxygen in a relative large excess and after the separation of chlorine, the remaining gas must be recycled to the reaction system.

The present invention has been completed with the foregoing in view. The present invention therefore provides a process for producing chlorine by using an excess amount of oxygen in the presence of chromic oxide, in which vaporized effective components are recovered effectively and after the oxidation, the excess portion of the oxygen is effectively reutilized.

In one aspect of this invention, there is thus provided a process for producing chlorine by oxidizing an offgas byproduced in a reaction step of an organic compound and containing hydrogen chloride therein, which comprises the following steps:

(1) subjecting the hydrogen chloride to an oxidation reaction at a temperature of 300°–500° C. in the presence of a chromic oxide catalyst by using oxygen in an amount of 0.25 mole or more per mole of the hydrogen chloride contained in the offgas;

(2) cooling a resultant gas, which primarily comprises chlorine, water, unreacted hydrogen chloride, oxygen and vaporized chromium, rapidly and then washing same with water, thereby recovering the chromium as an aqueous solution;

(3) washing the remaining portion of the resultant gas again with water to absorb the unreacted hydrogen chloride in the water, so that the unreacted hydrogen chloride is recovered as an aqueous hydrogen chloride solution;

(4) washing the still remaining portion of the resultant gas with sulfuric acid to remove water therefrom;

(5) compressing and cooling the still remaining portion of the resultant gas, said portion comprising chlorine primarily and containing unreacted oxygen, whereby the chlorine is separated as liquefied chlorine from the still remaining portion of the resultant gas; and (6) recycling a portion or the entire portion of the remaining gas, which has been obtained after the separation of the liquefied chlorine and is composed primarily of oxygen, as a circulating gas to the oxidation step (1).

DETAILED DESCRIPTION OF THE INVENTION

Figure 1:
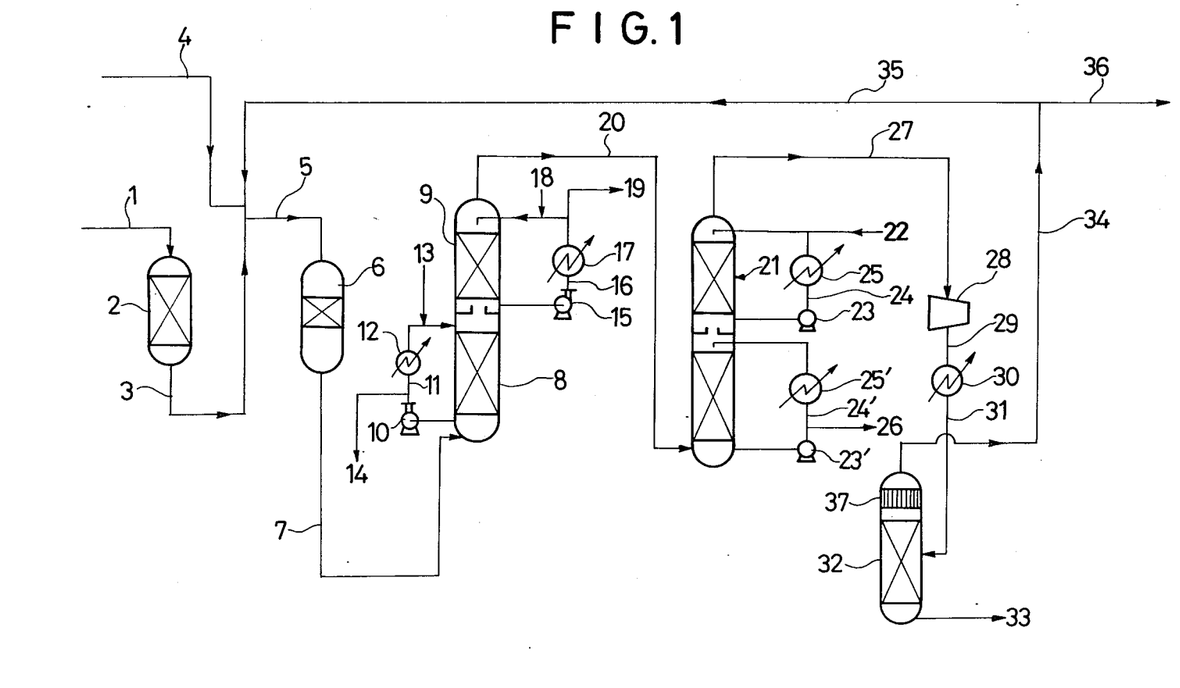
FIG. 1 is an exemplary flow sheet suitable to follow upon practice of the process of this invention, in which there are shown a reactor 6, a chromium washing column 8, a hydrogen chloride gas absorption column 9, a sulfuric acid washing column 21, a compressor 28 and a distillation column 32. Based on the flow sheet, the process of this invention will hereinafter be described in detail.

The raw material (i.e., hydrogen chloride) which has been discharged as an offgas from a reaction step of an organic compound is treated in an activated carbon column (not shown) prior to its introduction into the reactor 6 through a line 1 in FIG. 1. When the raw material, hydrogen chloride, is obtained on an industrial scale, the purity of the hydrogen chloride is not always high because the hydrogen chloride is formed as a byproduct in a substitution and condensation reaction of an organic compound. As conceivable impurities, there are for example organic compounds such as benzene and chlorobenzenes as well as inorganic gases such as nitrogen and carbon monoxide. Such organic compounds are chlorinated in the reaction between hydrogen chloride and oxygen, so that they are converted to organic compounds of higher boiling points. For example, benzene is converted to hexachlorobenzene. The thus-converted organic compounds of higher boiling points cause line blocking at the resultant gas outlet of the reactor 6, the resultant gas inlet of the hydrogen chloride gas absorption column 9, etc., thereby causing a plant trouble. In addition, it is required to handle the polychlorinated organic compounds. Since they are not preferred from the standpoint of industrial hygiene, they are usually removed before the oxidation of the offgas.

The organic compounds in the raw material, namely, in the offgas are mostly burnt or decomposed and evaporated to leave a tar-like substance behind upon production of chlorine by the oxidation reaction. Although the organic compounds deposited on the surface of the catalyst are partly removed accompanying the reaction gas, tar-like substances subjected to chlorination or partial oxidation on the catalyst deposit on the surface of the catalyst.

The catalytic activity is therefore determined by the balance between the amount of tar deposited on the surface of the catalyst and the amount of tar removed by combustion from the surface of the catalyst. Within a temperature range useful in the practice of the process of this invention, more tar is deposited to reduce the catalytic activity when the total content of organic compounds is higher than 1 wt. %. Although it is desirable that the total content of organic compounds in the raw material, namely, the offgas to be fed to the reactor is substantially zero, it is not practical to lower the total content to such a low level because a substantial cost is required to reduce the total content of the organic materials to zero or so. It is generally sufficient if the total content is reduced below 1 wt. %, preferably, to 100 ppm or so.

As a method for the treatment of the raw material, i.e., the offgas in order to reduce the total content of organic compounds contained therein, it is effective to treat the offgas with activated carbon. Any activated carbon may be employed irrespective of its kind, for example, fruit shell type, wood type or petroleum type activated carbon may be used so long as it can adsorb the organic compounds. Activated carbon can be used under ordinary use conditions for activated carbons. The amount of activated carbon to be used is determined by the total content of organic compounds contained in the offgas fed through the line 1 and the frequency of regeneration of the activated carbon. Either thermal generation or reduced-pressure generation can be applied for the regeneration of activated carbon. It is also effective to desorb activated carbon with steam or to regenerate activated carbon with hot stream of an inert gas. Needless to say, activated carbon may be thrown away without regeneration when it is used in a small amount. Although an absorption apparatus of the fixed-bed type is illustrated in FIG. 1, no problem or inconvenience will arise from the use of a moving-bed or fluidizedbed absorption apparatus which is widely employed.

Inorganic gas is scarcely adsorbed on activated carbon. If carbon monoxide is contained in an amount of 10 vol. % or more in the offgas, the service life of the chromic oxide catalyst tends to become shorter and more chromium component tends to evaporate from the catalyst. It is therefore preferable to treat the offgas in advance so that the content of carbon monoxide in the offgas is reduced to a level lower than 10 vol. %.

As a method for the treatment of the hydrogen chloride gas in order to reduce the content of carbon monoxide contained therein, it is effective to use a palladium catalyst which makes use of alumina as a carrier.

For example, a 1% palladium catalyst in the form of pellets, which makes use of alumina as a carrier, is packed in an oxidation column (not shown) of the fixed bed type. The offgas is then added with oxygen in an amount sufficient to lower the carbon monoxide in the offgas to a level lower than 10 vol. %. The offgas is then charged at SV 2,000 Nl/kg-cat.hr into the oxidation column. The oxidation of the carbon monoxide into carbon dioxide is then conducted at about 300° C. The conversion of hydrogen chloride to chlorine is not affected by the amount of carbon dioxide in the offgas. Carbon dioxide is eliminated by a subsequent purification step. Although not shown in FIG. 1, it is preferable to conduct this purification step after the activated carbon treatment column 2.

On the other hand, oxygen is fed through a line 4 in FIG. 1. For the same reasons as the organic compounds in the offgas, the oxygen is preferably free of oil. Oxygen obtained by low temperature separation of air may be employed by way of example. Since at least a portion of the oxygen is recycled for its use, it is preferable to charge oxygen of high purity through the line 4.

The offgas, which has been subjected to the activated carbon treatment and optionally to the treatment for lowering the content of carbon monoxide, is fed through a hydrogen chloride feed line 3 and is then mixed with oxygen gas fed through the oxygen feed line 4 and a recycled gas line 35. The resultant mixture is introduced into the reactor 6. The reactor 6 may be a fixed-bed reactor with the catalyst packed therein, a fluidized-bed reactor with the catalyst maintained in a fluidized state, or a reactor making use of both fixed-bed and fluidized-bed systems. In the reactor 6, the hydrogen chloride is oxidized with the oxygen to form chlorine and water.

The chromic oxide catalyst useful in the practice of this invention is prone to iron poisoning. Depending on the content of iron in the material of equipment to be used, the chromic oxide catalyst may be poisoned so that its high activity can hardly be maintained for a long period of time. It is therefore desirable to use a material, which contains iron in an amount of 1 wt. % or less, as the material for the reactor.

Although a ceramic material like glass, for example, a high thermal endurance glass such as Pyrex (trade mark) may be used, a metallic material is preferred when the strength is taken into consideration. As a metallic material, nickel steel, titanium steel or the like is preferred. Here, its iron content is preferably below 1 wt. %. Stainless steel such as SUS 304 and SUS 316 and high nickel alloy steel such as "Hastelloy B", "Hastelloy C" and "Incoloy" (trade names) have high corrosion resistance. Their iron contents are however higher than 1 wt. % so that the chromic oxide catalyst undergoes severe iron poisoning, resulting in increased consumption of the chromic oxide catalyst. It is therefore impractical to use such materials. Although niobium and tantalum are substantially free of iron, they are not resistant to corrosion and are hence not usable.

The chromic oxide catalyst useful in the practice of this invention contains chromia ($Cr_2O_3$) as its principal component. It can be prepared by either precipitation or dipping process.

In the precipitation process, chromic nitrate or chromic chloride is used as a salt of trivalent chromium and ammonia is used as a neutralizing agent for obtaining a precipitated catalyst from the trivalent chromium. The resulting chromic hydroxide is calcined at temperatures not reaching 800° C. to form chromic oxide. Chromic oxide as a principal component is then molded by using silicon oxide as a binder. In the dipping process, silicon oxide the pore volume of which is preferably 0.3-1.5 cc/g is used as a carrier by way of example. The carrier is dipped in an aqueous solution of a water-soluble chromium salt or chromic anhydride ($CrO_3$) so that the chromium salt or chromic anhydride is supported on the carrier. After drying the carrier with the chromium salt or chromic anhydride supported thereon, it is calcined at 300°-400° C. for 1-2 hours. This dipping, drying and calcining procedure is repeated several times so as to support 20-60 wt. % of chromia, followed by further calcining at 400°-600° C. On these catalysts, the present inventors have already filed a separate application for patent (Japanese Patent Application No. 254234/1984).

In the present invention, the pressure of the reactor 6 is in a range of 0.1-5 kg/cm²G, preferably, 3-4 kg/cm²G, while the reaction temperature is 300°-500° C., preferably, 350°-450° C. The conversion velocity of hydrogen chloride becomes faster as the reaction temperature rises. However, the amount of vaporized chromium, increases as the reaction temperature rises.

The reaction between hydrogen chloride and oxygen is shown by the following reaction formula (1):

$$4HCl + O_2 \rightleftharpoons 2Cl_2 + 2H_2O \qquad (1)$$

As shown by the above reaction formula, one mole of oxygen is a stoichiometric amount for 4 moles of hydrogen chloride. Since it is necessary to maintain the chromic acid catalyst always in an oxidizing atmosphere during its use, the ratio of hydrogen chloride to oxygen in a mixed gas line 5 connected to the reactor 6 must be at least 0.25 mole of oxygen per mole of hydrogen chloride, with a range of 0.25-10 moles being preferred. More preferably, the flow rate of oxygen through the line 4 and that of the recycled gas through the line 35 are controlled to maintain the amount of oxygen within a range of 0.5-2 moles per mole of hydrogen chloride in the mixed gas line 5.

If the molar ratio of oxygen to hydrogen chloride is 0.25 or lower, the conversion of hydrogen chloride is low, the separation apparatus of unreacted hydrogen chloride gas becomes to large, the material cost increases and the catalytic activity drops in a short period of time. It is hence disadvantageous to use oxygen in such a small amount.

If the molar ratio of oxygen to hydrogen chloride exceeds 10, the concentration of the resultant chlorine in the reaction gas is low so that the separation of chlorine from the reaction gas is difficult.

The resultant gas, which has flowed out of the reactor 6, is a gas containing water, chlorine, unreacted hydrogen chloride, oxygen, and vaporized chromium and trace amount of inorganic gas originated from catalyst components and having a higher temperature of 300°-500° C.

The resultant gas then enters the chromium stripping column 8, in which it is cooled rapidly and washed with water. Since chromic oxide is used as a catalyst in the present invention, it accompanies the resultant gas as vaporized chromium. It is hence extremely important to remove and recover the vaporized chromium from the resultant gas. In the present invention, the vaporized chromium compound originated from the catalyst and the chromium powder scattered from the fluidized bed are contained in the resultant gas although their amounts are small. A trace amount of chromium is therefore mixed in an aqueous hydrogen chloride solution in the case of usual water washing which is intended to recover and remove hydrogen chloride. The aqueous hydrogen chloride solution cannot therefore be used for usual applications of hydrochloric acid. It is difficult to recover the chromium component from hydrochloric acid.

For the above-mentioned reasons, the chromium component is separated and recovered at a high concentration in a washing in the first water-washing step in this invention. Specifically, the resultant gas is fed to the chromium washing column 8 through which water is recirculated. The resultant gas is hence cooled rapidly and the vaporized chromium is recovered in the water. In a steady state, the recirculated water is in the form of a saturated hydrogen chloride solution at the temperature and pressure. Since the amount of water increases owing to condensation of the resulting water in the recovery tower, chromium cannot be concentrated. In order to avoid the increase in amount of the aqueous hydrogen chloride solution, it is desirable to conduct the washing of the resultant gas near the azeotropic temperature. When the reaction is conducted under usual conditions, i.e., at about 3–4 kg/cm$^2$G, it is preferable to operate the stripping tower at 90°–130° C.

Under the above-described conditions, the chromium compounds contained in the form of vapor in the resultant gas are washed by and concentrated in the saturated aqueous hydrogen chloride solution to be recycled. By taking the aqueous hydrogen chloride solution, which contains chromium compounds at high concentrations, little by little constantly out of the washing column, it is possible to remove chromium compounds completely while maintaining the concentrations of the recovered chromium compounds constant. Here, the amount of water to be recycled is determined by controlling the operation temperature of the washing tower, namely, by balancing the amount of the resulting water to be condensed and the amount of the aqueous hydrogen chloride solution to be subjected to azeotropic evaporation as well as the amount of the chromium-containing aqueous hydrogen chloride solution to be drawn out. If necessary, additional water may be fed suitable through a water makeup port 13 so as to facilitate the control of the operation in the column. As the chromium concentration increases in the aqueous hydrogen chloride solution to be recycled from the chromium washing column, the amount of hydrogen chloride to be lost as the chromium-containing aqueous hydrogen chloride solution to be drawn out decreases and at the same time, the amount of a neutralizing agent to be required for the recovery of chromium also decreases.

The resulting gas from which the vaporized chromium has been removed in the above-described manner then enters the hydrogen chloride gas absorption column 9. Water of 20°–100° C., preferably, below 60° C. is circulated through the absorption column 9, so that the resultant gas is cooled rapidly. As a consequence, a substantial portion of water in the resultant gas, which water has been formed by the reaction, is condensed and a majority of hydrogen chloride gas in the resultant gas is separated.

Since the hydrogen chloride in the resultant gas has an extremely high solubility in water compared with the other gas components, the concentration of hydrogen chloride in the washing water which is recycled and reused increases so that the absorption of hydrogen chloride from the resultant gas becomes insufficient. It is however possible to prevent the concentration of hydrogen chloride from increasing in the recycled washing water by adding water from the water makeup port 18 or by adjusting the amount of the aqueous hydrogen chloride solution to be drawn out through a discharge port 19 for the aqueous hydrogen chloride solution. As a result, it is possible to maintain the concentration of hydrogen chloride in the resultant gas substantially at a trace level. The aqueous hydrogen chloride solution drawn out of the discharge port 19 for the aqueous hydrogen chloride solution can generally be used as hydrochloric acid as is. It is also possible to heat the aqueous hydrogen chloride solution so as to generate hydrogen chloride, which can then be used again as the raw material, i.e., hydrogen chloride in the present reaction. The aqueous hydrogen chloride solution to be recycled is then cooled by a cooler 17 to adjust its temperature to a constant temperature. A packed column, plate column, spray column or the like can be used as the hydrogen chloride gas absorption column 9. Such columns can also be combined together. A plurality of absorption columns may also be used in series so as to achieve more complete absorption.

The chromium washing column 8 in the preceding step and the hydrogen gas absorption column 9 may be provided as discrete columns instead of the integrated single column.

The resultant gas contains chlorine and small amounts of water, hydrogen chloride and an inorganic gas. After washed with water, it flows through a resultant gas flow line 20 into the sulfuric acid washing column 21.

Through the sulfuric acid washing column 21, sulfuric acid of 20°–80° C., preferably, below 60° C. is circulated by a sulfuric acid pump 23. The resultant gas is thus brought into contact with the sulfuric acid so that the water still remaining in the resultant gas is completely absorbed in the sulfuric acid.

In order to maintain the concentration of the sulfuric acid at a suitable level in a sulfuric acid circulation system 24, the flow rate of sulfuric acid through a sulfuric acid makeup port 22 and that of dilute sulfuric acid through a dilute sulfuric acid discharge port 26 are controlled. The sulfuric acid is cooled in a cooler 25 so as to adjust its temperature to a predetermined temperature.

The dilute sulfuric acid can be concentrated and hence reused by heating it under normal pressure or reduced pressure. A packed column, plate column, spray column or the like can be used as the sulfuric acid washing column 21. Such columns can also be combined together. A plurality of washing columns may also be used in series so as to achieve more complete absorption.

The resultant gas which has flowed out of the sulfuric acid washing column 21 is then fed through a line 27, compressed by the compressor 28, delivered through a line 29, and then cooled by a cooler 30.

As to the liquefaction of chlorine, there is a liquefiable range which is defined by both pressure and temperature. As the temperature is lowered within this range, the compression pressure may be lowered. For an industrial application, the compression temperature and cooling temperature are determined in view of the most suitable economical conditions within the above range because the initial investment should also be taken into parallel consideration. In a usual operation, it is preferable to conduct the liquefaction of chlorine at a compression pressure of 10–25 kg/cm$^2$G and a temperature of $-15°$ – $-30°$ C. The resultant gas which has been compressed to a desired optimum pressure is then fed into the distillation tower 32. The resultant gas is then distilled while being cooled and liquefied by a cooler 37 which is provided in an upper part of the distillation column 32 and is cooled by a refrigerator (not shown).

Within the cooler 37, the resultant gas is separated into liquefied chlorine and a gas phase which contains oxygen gas, inorganic gas, a small amount of hydrogen chloride gas and uncondensed chlorine gas. The liquefied chlorine is then taken out of the distillation column 32 through the bottom thereof, thereby providing liquefied chlorine 33. No special structure is necessary for the distillation column. It may be of the same type as a plate column or packed column employed in usual distillation under elevated or normal pressure.

The gas, which has been separated in the distillation column 32 and contains the excess oxygen gas, inorganic gas, small amount of hydrogen chloride gas and uncondensed chlorine, flows out as a remaining gas through a line 34. In order to reuse the oxygen in the remaining gas for the oxidation of the raw material hydrogen chloride, it is fed back through a recycled gas flow line 35 and is mixed in the mixed gas of the raw material hydrogen chloride and oxygen.

The inorganic gas contained in the raw material hydrogen chloride and oxygen increases gradually in the course of a continuous operation. It is hence desirable to release the remaining gas little by little constantly as a waste gas out of the system. The amount of the waste gas to be released through the line 36 is determined in accordance with the amount of the inorganic gas contained in the offgas supplied through the raw material feed line 1 and the oxygen fed through the feedline 4. Namely, it is necessary to release more and more remaining gas through the line 36 as the amount of the inorganic gas contained in the offgas and the oxygen increases. Therefore, the amount of the remaining gas to be released out of the system is determined suitably in view of the aforementioned conditions.

The concentration of chlorine contained in the gas phase drops as the compression pressure for the dried resultant gas fed through the flow line 27 is increased and the cooling temperature for the dried resultant gas is lowered. Correspondingly, the chlorine content drops in the portion of the remaining gas, which is recycled as a recycled gas to the reactor 6 through the recycled gas flow line 35.

The reaction in which hydrogen chloride is oxidized with oxygen to form chlorine is an equilibrium reaction as shown above by the reaction formula (1). When the amount of chlorine in the gas recycled through the line 35 is high, the equilibrium is shifted toward the left side of the formula (1) so that the amount of chlorine produced per unit amount of hydrogen chloride fed decreases and less chlorine is hence produced. From this viewpoint, it is advantageous to increase the compression pressure and at the same time to decrease the cooling temperature. It is however desirable to lower the compression pressure and to raise the cooling temperature when the quantity of energy to be used and the cost for equipment to be employed are taken into consideration.

Namely, the compression pressure and cooling temperature are of such nature that they are determined not only by reaction conditions but also by economical conditions as described above.

Where chlorine is still contained at an unignorably high level in the remaining gas to be released through the line 36, it is possible to compress the remaining gas, which is to be released through the line 36, at a pressure higher than the initial compression pressure. The thus-compressed gas is thereafter cooled to condense chlorine, followed by distillation in a separate distillation column to separate chlorine Example 1:

Through a heat exchanger (by subjecting to a heat exchange with cold hydrogen chloride gas at the exit of the activated carbon column), 50.6 kg/hr of a raw material, namely, an offgas (1.41 kg mole; hydrogen chloride: 93.7 wt. %, oxygen: 1.3 wt. %; nitrogen: 2.0 wt. %, carbon monoxide: 2.8 wt. %, orthodichlorobenzene (ODCB): 0.2 wt. %) discharged at 4 kg/cm$^2$G and 30° C. from a purification step of TDI (tolylene diisocyanate) was cooled to $-2°$ C. The offgas in which the concentration of ODCB had been reduced to about 0.1 wt. % was then caused to pass through the column 2 packed with 100 kg of activated carbon (in a granular form of 4×6 mm) which had been obtained by subjecting coconut shells to dry distillation, thereby lowering the concentration of ODCB to 0.04 wt. % in the hydrogen chloride gas. The hydrogen chloride gas was then introduced into the heat exchanger, in which the hydrogen chloride gas is subjected to a heat exchange with the offgas as the raw material so that the hydrogen chloride gas was warmed to 25° C. After an addition of 10.2 kg/hr of oxygen (0.3 kg mole; oxygen: 99.6 wt. %, nitrogen: 0.4 wt. %), the resultant mixed gas was charged in a heater and was then heated to 200° C. with heated steam. The thus-heated mixed gas was then caused to pass through a column (not shown) packed with 10 kg of a catalyst (in a granular form of 5×10 mn) of 1 wt. % of palladium supported on an alumina carrier, whereby CO in the hydrogen chloride gas was converted to $CO_2$ to reduce the CO content to 0.01 vol. % or less. The resulting mixed gas was then added with 24.5 kg/hr of a gas (0.7 kg mole; hydrogen chloride: trace, oxygen: 40.8 wt. %, water: trace, chlorine: 9.7 wt. %, nitrogen: 16.3 wt. %, carbon dioxide gas: 33.2 wt. %) recycled through the line 35, followed by introduction into the fluidized bed reactor 6.

The fluidized bed reactor 6 was a cylindrical reactor which was about 0.3 m across and about 3 m high and was lined with Ni. The fluidized bed reactor 6 was packed with 39.5 kg of a particulate chromia catalyst having an average particle size of 50–60 μm. The catalyst had been obtained by adding colloidal silica as an binder to chromic hydroxide, which had in advance been precipitated with aqueous ammonia solution from an aqueous solution of chromic nitrate, forming the resultant slurry into particles by a spray drying technique and then calcining the particles at 600° C. The above mixed gas of the hydrogen chloride gas, oxygen gas and recycled oxygen-containing gas was subjected at 400° C. in the presence of the catalyst to a continuous oxidation reaction in the fluidized bed reactor. The resultant gas (hydrogen chloride: 17.6 wt. %, oxygen: 15.1 wt. %, water: 9.4 wt. %, chlorine: 39.8 wt. %, nitrogen: 5.9 wt. %, carbon dioxide: 12.2 wt. %, chromium: 0.05 wt. %) obtained by the oxidation was charged at a flow rate of 85.3 kg/hr (2.2 kg mole) into the chromium washing column 8.

The chromium washing column 8 includes the hydrogen chloride gas absorption column 9 in an upper part thereof, and is a column containing a packing material therein and having a diameter of about 0.3 m and a height of about 6 m. The lower column serves to washing chromium. Water is sprayed from the top of the washing column and is drawn out through the bottom. The water is continuously circulated. The temperature of the circulated water was controlled at 120° C. by a cooler.

The hydrogen chloride and the vaporized and scattered portion of the chromium contained as a principal component in the catalyst, both contained in the resultant gas, were washed with water, so that they were converted into an aqueous solution. In order to draw out the aqueous solution with a constant chromium concentration by recycling and reusing the aqueous solution, water is always replenished at a constant rate to the circulation system so that the aqueous solution was continuously drawn out at a chromium concentration of about 1.0 wt. %. The aqueous hydrogen chloride solution with chromium components dissolved therein was thereafter neutralized with an alkali and was then recovered.

The resultant gas, which had flowed out of a mist separator provided on the top of the packing material in the chromium washing column, was charged into the hydrogen gas absorption column 9. The absorption column 9 was packed with Raschig rings of 1 inch. Water of 25° C. was charged at a flow rate of 38.5 kg/hr from the top so as to wash the resultant gas in a counter-current fashion. After the washing, water the temperature of which had arisen to 70° C. was cooled to 50° C. by a cooler and then recycled for its reutilization for washing.

During the recycled washing solution, the washing (an aqueous hydrogen chloride solution; hydrogen chloride: 24.7 wt. %, water: 74.6 wt. %, chlorine: 0.7 wt. %) of 70° C. was drawn out at a flow rate of about 60 kg/hr through an outlet of a circulation pump.

The resulting gas, which had been washed with water in the hydrogen chloride gas washing column 9 to lower the concentration of hydrogen chloride gas to a trace level, was cooled to 20° C. by a cooler and then charged into the sulfuric acid washing column 21.

The sulfuric acid washing column 21 contained a packing material therein, was about 0.3 m across and about 7 m high, and was divided into two parts, i.e., an upper washing column and an lower washing column, both equipped with a PVC lining.

To an upper part of the upper washing column, 90-95% sulfuric acid of 50°-60° C. was fed to wash the resultant gas in a counter-current fashion so as to dry the gas.

A portion of the sulfuric acid, which had accumulated on the bottom of the upper washing column after washing the resultant gas, was drawn out and cooled to 50°-60° C. by a cooler and was then recycled by a recycling pump for its reutilization in the sulfuric acid washing column. To this recycling system, 98% sulfuric acid was continuously replenished at a rate of 3.0 kg/hr in order to maintain the concentration of sulfuric acid at 90-95%.

The remaining portion of the sulfuric acid flowed down on the bottom of the upper washing column was then allowed to flow downwardly to an upper part of the lower washing column, where the resultant gas was subjected to further counter-current washing and drying. The sulfuric acid, which had flowed down to the bottom of the lower washing column, was taken out of and was then adjusted to 50°-60° C. by a cooler. It was thereafter fed back, i.e., recycled as 70% sulfuric acid by a recycling pump to the upper part of the lower washing column in order to wash and dry the resultant gas.

From the outlet of the recycling pump of this recycling system, app. 70% sulfuric acid was taken out at 4.2 kg/hr.

The resultant gas of 50° C. (hydrogen chloride: trace, oxygen: 20.8 wt. %, water: trace, chlorine: 54.2 wt. %, nitrogen: 8.2 wt. %, carbon dioxide: 16.8 wt. %), which had flowed out of the sulfuric acid washing column was charged at a flow rate of 61.9 kg/hr (1.3 kg mole) into the compressor 28, in which it was compressed from 4 kg/cm$^2$G to 25 kg/cm$^2$G, followed by cooling to $-2.5°$ C.

The thus-compressed resultant gas, which had been cooled to $-2.5°$ C., was then charged into the distillation column 32 in order to liquefy and separate the chlorine in the resultant gas completely. The distillation column had an inner diameter of about 0.15 m and a height of about 6 m and was internally packed with a packing material. In an upper part, there was provided the cooler 37 which cooled the reactant gas by means of the refrigerator. The compressed resultant gas charged to the middle stage of the distillation column 32 was cooled by the cooler provided in the upper part. The chlorine in the resultant gas was liquefied and condensed at about $-17°$ C., so that the liquefied chlorine was allowed to flow down through the packing material in the column to the bottom of the distillation column.

In the course of the downward flow of the liquefied chlorine, the liquefied chlorine was distilled and impurities in the liquefied chlorine were discharged along with the remaining gas such as oxygen to the top of the distillation column. The liquefied chlorine on the bottom was separated at 30.8 kg/hr (0.4 kg mole) through the line 33. The liquefied chlorine had the following composition: hydrogen chloride: trace, oxygen: 0.6 wt. %, water: trace, chlorine: 99.9 wt. %, nitrogen: trace, carbon dioxide: 0.4 wt. %. On the other hand, the unliquefied gas, i.e., the remaining gas which had been discharged to the top of the distillation column was composed primarily of oxygen and also contained an inorganic gas (hydrogen chloride: trace, oxygen: 40.8 wt. %, water: trace, chlorine 9.7 wt. %, nitrogen: 16.3 wt. %, carbon dioxide: 33.2 wt. %). The remaining gas was then recycled at a flow rate of 24.5 kg/hr through the line 35 and mixed in the mixed gas to be fed to the inlet to the reactor 6.

A portion of the remaining gas 36 was fed at a flow rate of 6.6 kg/hr to a decontamination column (not shown), in which it was washed with water, followed by release into the atmosphere.

EXAMPLE 2

Using, as a raw material gas, 39.7 kg/hr (1.1 kg mole) of hydrogen chloride gas of 4 kg/cm$^2$G and 28° C. having exactly the same composition as the raw material gas employed in Example 1, the oxidation of the hydrogen chloride gas conducted in exactly the same manner and apparatus as in Example 1 except for the following modifications.

(1) After the treatment with activated carbon, the other raw material, i.e., oxygen was introduced at a rate of 8.0 kg/hr (0.25 kg mole) as opposed to 10.2 kg/hr (0.3 kg mole) in Example 1.

(2) The flow rate of the recycled oxygen-containing gas, which was recycled through the flow line 35, was increased 38.0 kg/hr (1.1 kg mole) from 24.5 kg/hr (0.7 kg mole) in Example 1. In Example 1, the recycled oxygen-containing gas had the following composition: hydrogen chloride: trace, oxygen: 40.8 wt. %, water: trace, chlorine: 9.7 wt. %, nitrogen: 16.3 wt. %, carbon dioxide: 33.2 wt. %. On the other hand, its composition was as follows in Example 2: hydrogen chloride: trace, oxygen: 42.1 wt. %, water: trace, chlorine: 9.8 wt. %, nitrogen: 15.9 wt. %, carbon dioxide: 32.2 wt. %. Namely, oxygen was fed at a rate of 0.75 mole per mole of the raw material hydrogen chloride as opposed to 0.5 mole per mole of the raw material hydrogen chloride in Example 1.

(3) The catalyst employed in the fluidized bed reactor 6 was prepared by dipping a silicon oxide carrier having a pore volume of 1.0 cc/g and an average particle size of 50-60 μm in an aqueous solution of anhydrous chromic acid, followed by calcining at 500° C. The catalyst contained 60 wt. % of chromic oxide. The reactor was packed with 30.9 kg of the catalyst prepared by the above dipping process.

(4) In Example 1, the resultant gas obtained by the oxidation reaction had the following composition: hydrogen chloride: 17.6 wt. %, oxygen: 15.1 wt. %, water: 9.4 wt. %, chlorine: 39.8 wt. %, nitrogen: 5.9 wt. %, carbon dioxide: 12.2 wt. %, chromium: 0.05 wt. %, and was discharged at 85.3 kg/hr (2.2 kg mole) from the reactor. In Example 2, the resultant gas had the following composition: hydrogen chloride: 14.4 wt. %, oxygen: 21.4 wt. %, water: 7.2 wt. %, chlorine: 32.6 wt. %, nitrogen: 8.0 wt. %, carbon dioxide: 16.4 wt. %, chromium: 0.06 wt. %, and was discharged at 85.6 kg/hr (2.2 kg mole).

(5) In Example 1, water of 25° C. was charged at a rate of 38.5 kg/hr to the top of the hydrogen chloride gas absorption column 9 and the washing was taken out at 60 kg/hr from the outlet of the recycling pump. In Example 2, water was charged at 32.5 kg/hr and washing was taken out at 49 kg/hr (the compositions of both washings were the same).

(6) In the sulfuric acid washing column 21, 98% sulfuric acid was replenished at 3.0 kg/hr while drawing out 70% sulfuric acid at 4.2 kg/hr in Example 1. On the other hand, the former sulfuric acid was replenished at 2.31 kg/hr while taking out the latter sulfuric acid at 5.0 kg/hr in Example 2.

(7) In Example 1, the resultant gas of 50° C. which had flowed out of the sulfuric acid washing column had the following composition: hydrogen chloride: trace, oxygen: 20.8 wt. %, water: trace, chlorine: 54.2 wt. %, nitrogen: 8.2 wt. %, carbon dioxide: 16.8 wt. %) and was charged at a flow rate of 61.9 kg/hr (1.3 kg mole) into the compressor 28. In Example 2, the resultant gas of 50° C. had the following composition: hydrogen chloride: trace, oxygen: 27.4 wt. %, water: trace, chlorine: 41.2 wt. %, nitrogen: 10.3 wt. %, carbon dioxide: 21.1 wt. %) and was charged at a flow rate of 66.8 kg/hr (1.5 kg mole) into the compressor 28.

Following the procedure of Example 1, the oxidation was conducted under the above-mentioned conditions. As a result, liquefied chlorine was obtained at a flow rate of 23.6 kg/hr (0.34 kg mole) from the bottom of the distillation column 32 and through the line 33. Its composition was exactly the same as the composition of liquefied chlorine in Example 1. In addition, a portion of the unliquefied gas which had discharged from the top of the distillation column was released at 5.3 kg/hr through the line 36 to a decontamination column (not shown) provided outside the reaction system.

EXAMPLE 3

An offgas, which had been discharged from a chlorination step of benzene and contained 1% of benzene, was caused to pass as a raw material through a column packed with 2 kg of activated carbon, so that the concentration of benzene in the hydrogen chloride gas was lowered to about 100 ppm after the treatment.

On the other hand, a catalyst was prepared in the following manner.

In 30 l of deionized water, 3.0 kg of chromic nitrate nonahydrate was dissolved. While stirring the resultant solution thoroughly, 2.9 kg of a 28% aqueous ammonia solution was added dropwise over 30 minutes.

Deionized water was added to a slurry of the resulting precipitate to dilute the latter to 200 l. After the above-diluted slurry was allowed to stand overnight, it was subjected to repeated decantation so as to wash the precipitate. Colloidal silica was then added in an amount of 10% of the total weight of a mixture to be obtained after calcining. The mixed slurry was thereafter dried in a spray drier to obtain powder. The powder was then calcined at 600° C. for 3 hours in an air atmosphere.

The powder was thereafter sifted by means of JIS standard sieves to collect particles having an average particle size (medium size) of 50-60 μm as a chromia catalyst.

A Ni-made fluidized-bed reactor having an inner diameter of 2 inches was then packed with 375 g of the above catalyst. While externally heating the reactor at 340° C. by a fluidized sand bath, the activated carbon treated gas and oxygen gas were introduced respectively at 1.25 Nl/min and 0.63 Nl/min to the catalyst bed and were then subjected to an oxidation reaction while maintaining the catalyst in a fluidized state.

The temperature of the catalyst bed arose to 350° C. owing to the generation of heat. A gas, which had flowed out of the reactor, was introduced in a trap constructed of an absorption bottle of an aqueous solution of potassium iodide and another absorption bottle of an aqueous solution of caustic soda, both, connected together in series. The aqueous solution of potassium iodide and the aqueous solution of caustic soda were titrated respectively with sodium thiosulfate and hydrochloric acid to quantitatively analyze the unreacted hydrogen chloride and the resultant chlorine.

The conversion of hydrogen chloride was 70% immediately after the initiation of the reaction. Even 200 hours later, a conversion of 69% was still achieved. After the reaction, the carbon content of the catalyst was 50 ppm as shown under Experiment 1 in Table 1.

For the sake of comparison, a similar oxidation reaction was conducted by using, as a raw material, an offgas which had not been treated with activated carbon and contained 1 wt. % of benzene. Another oxidation reaction was also conducted at a varied rate of excess oxygen in order to investigate the decrease of the conversion and the carbon content in the catalyst after the reaction. Results are shown respectively under Experiments 2 and 3 in Table 1.

TABLE 1

| | $SV_{HCl}$ = 200 Nl/kg-cat · hr 350° C. | | | |
|---|---|---|---|---|
| Exp. No. | $O_2$/HCl molar ratio | Conversion (%) | | Carbon content (ppm) |
| | | At start | 200 hrs later | |
| 1 | 0.5 | 70 | 69 | 50 |

TABLE 1-continued

| | $SV_{HCl}$ = 200 Nl/kg-cat · hr 350° C. | | | |
|---|---|---|---|---|
| Exp. No. | $O_2$/HCl molar ratio | Conversion (%) | | Carbon content (ppm) |
| | | At start | 200 hrs later | |
| 2 | 0.5 | 70 | 61 | 900 |
| 3 | 0.3 | 60 | 34 | 5000 |

EXAMPLE 4

An offgas, which had been discharged from a phosgenation step of tolylene diamine and contained 10 vol. % of carbon monoxide gas besides hydrogen chloride, was employed as a raw material. After an addition of oxygen to the offgas, the mixed gas was fed to a Ni-made oxidation apparatus.

The oxidation apparatus was packed with 1 kg of a pellet-like catalyst which contained 1 vol. % of palladium supported on an alumina carrier. When the temperature of the oxidation apparatus was maintained at 300° C., the content of carbon monoxide gas in the offgas was 3 wt. % at the outlet of the oxidation apparatus.

A Ni-made fluidized bed reactor having an inner diameter of 4 inches, which was packed with 1507 g of the chromia catalyst prepared in Example 3, was externally heated to 370° C. by a fluidized sand bath. The above offgas and oxygen gas were then introduced respectively at flow rates of 13 Nl/min (HCl: 12.6 Nl, CO: 0.4 Nl, $CO_2$: 0.98 Nl) and 6.3 Nl/min (HCl basis, SV 500 Nl/kg-cat.hr; rate of excess oxygen: 100%) into the fluidized bed, whereby they were subjected to an oxidation reaction while maintaining the catalyst in the fluidized state.

The temperature of the catalyst bed arose to 400° C. owing to the generation of heat. The gas, which had flowed out of the reactor, was then introduced in a trap composed of an absorption bottle of an aqueous solution of potassium iodide and another absorption bottle of an aqueous solution of caustic soda. The aqueous solution of potassium iodide and aqueous solution of caustic soda were titrated respectively with sodium thiosulfate and hydrochloric acid, so that the unreacted hydrogen chloride and the formed chlorine were quantitatively analyzed.

Immediately after the initiation of the reaction, the conversion of hydrogen chloride was 68%. A conversion of 66% was achieved even 200 hours later. Even after proceeding with the reaction for 200 hours, the weight loss of the catalyst was 30 g. It was as little as 2% of the amount of the catalyst packed at the beginning.

For the sake of comparison, the offgas, which had been discharged from the phosgenation step of tolylene diamine and contained 10 vol. % of carbon monoxide, and an oxygen gas were introduced respectively at flow rates of 14 Nl/min (HCl: 12.6 Nl, CO: 1.4 Nl) and 6.3 Nl/min (HCl basis, SV 500 Nl/kg-cat.hr; rate of excess oxygen: 100%) into the above fluidized bed, whereby they were subjected to an oxidation reaction while maintaining the catalyst in a fluidized state.

The temperature of the catalyst bed arose to 400° C. owing to the generation of heat. The unreacted hydrogen chloride and the formed chlorine were quantitatively analyzed in the same manner as described above. The conversion of hydrogen chloride was 65% immediately after the initiation of the reaction. In 200 hours, it however dropped to 55%. After proceeding with the reaction for 200 hours, the weight loss of the catalyst was 90 g. It was as much as 6% of the amount of the catalyst packed at the beginning.

We claim:

1. A process for producing chlorine by oxidizing an offgas by-product of a reaction step of an organic compound containing hydrogen chloride therein, which comprises the following steps:
    (1) subjecting the hydrogen chloride to an oxidation reaction at a temperature of 300°-500° C. in the presence of a chromic oxide catalyst by using oxygen in an amount of 0.25 mole or more per mole of the hydrogen chloride contained in the offgas to produce a reaction mixture;
    (2) cooling said reaction mixture, which comprises chlorine, water, unreacted hydrogen chloride, oxygen and vaporized chromium, and then washing same with water at a temperature of 90°-130° C. in a washing column, thereby recovering the chromium as an aqueous solution and yielding a remaining portion of gas;
    (3) washing said remaining portion of gas again with water to absorb the unreacted hydrogen chloride in the water, so that the unreacted hydrogen chloride is recovered as an aqueous hydrogen chloride solution and yielding in a second remaining portion of gas;
    (4) washing the second remaining portion of gas with sulfuric acid to remove water therefrom and to thereby yield a third remaining portion of gas;
    (5) compressing and cooling the third remaining portion of gas, said portion comprising chlorine and unreacted oxygen, whereby the chlorine is separated as liquefied chlorine from the third remaining portion of gas thereby yielding a fourth remaining portion of gas; and
    (6) recycling a portion or all of said fourth remaining portion of gas, which has been obtained after separation of said liquefied chlorine and comprises oxygen, as a circulating gas to the oxidation step (1).

2. The process as claimed in claim 1, wherein step (3) is carried out at a temperature of 20°-100° C.

3. The process as claimed in claim 1, wherein step (4) is carried out at a temperature of 20°-80° C.

4. The process as claimed in claim 1, wherein the oxygen is used in an amount of 0.5-2 moles per mole of the hydrogen chloride in the oxidation reaction.

5. The process as claimed in claim 1, wherein the oxidation reaction is carried out at 350°-450° C.

6. The process as claimed in claim 1, wherein the oxidation reaction is carried out at a pressure of 3-4 kg/cm$^2$G.

7. The process as claimed in claim 1, wherein the oxidation reaction is carried out in a reactor, wherein said reactor is made of a material which contains 1 wt. % or less of iron.

8. In a procoess for producing chlorine by oxidizing an offgas by-product of a reaction step of an organic compound and containing hydrogen chloride therein, the improvement wherein the oxidation of the offgas is conducted in the presence of a chromic oxide catalyst after lowering the content of the organic compound in the offgas to a level lower than 1 wt. % based on the weight of offgas.

9. The process as claimed in claim 8, wherein the content of the ogranic compound is lowered by absorbing the organic compound on activated carbon.

10. In a process for producing chlorine by oxidizing an offgas by product of in a reaction step of an organic compound and containing hydrogen chloride therein, the improvement wherein the oxidation of the offgas is conducted in the presence of a chormic oxide catalyst after lowering the content of carbon monoxide in the offgas to a level lower than 10 vol. %.

11. The process as claimed in claim 10, wherein the content of the carbon monoxide in the offgas is lowered by bringing the carbon monoxide into contact with oxygen in the presence of a palladium catalyst, which contains alumina as a carrier, and converting the carbon monoxide into carbon dioxide gas.

* * * * *